United States Patent
Austinat et al.

(10) Patent No.: US 9,108,376 B2
(45) Date of Patent: Aug. 18, 2015

(54) METHOD FOR MAKING A WIND TURBINE ROTOR BLADE HALF SHELL OR WIND TURBINE ROTOR BLADE AND PRODUCTION MOLD THEREFOR

(71) Applicant: Nordex Energy GmbH, Hamburg (DE)

(72) Inventors: Dirk Austinat, Jarmen (DE); Marco Frankowski, Osteebad Wustrom (DE)

(73) Assignee: Nordex Energy GmbH, Hamburg (DE)

( * ) Notice: Subject to any disclaimer, the term of this patent is extended or adjusted under 35 U.S.C. 154(b) by 377 days.

(21) Appl. No.: 13/776,214

(22) Filed: Feb. 25, 2013

(65) Prior Publication Data

US 2013/0312900 A1 Nov. 28, 2013

(30) Foreign Application Priority Data

May 23, 2012 (EP) .................................... 12004027

(51) Int. Cl.
*B29C 33/00* (2006.01)
*B29D 99/00* (2010.01)
*B29C 33/30* (2006.01)
(Continued)

(52) U.S. Cl.
CPC ............ *B29D 99/0028* (2013.01); *B29C 33/30* (2013.01); *B29C 33/306* (2013.01); *B29C 70/30* (2013.01); *F03D 1/0641* (2013.01); *F03D 1/0683* (2013.01); *B29C 65/483* (2013.01); *B29C 65/485* (2013.01); *B29C 66/112* (2013.01); *B29C 66/116* (2013.01); *B29C 66/301* (2013.01); *B29C 66/324* (2013.01); *B29C 66/54* (2013.01); *B29C 66/71* (2013.01); *B29C 66/721* (2013.01); *B29C 66/7212* (2013.01); *B29L 2031/085* (2013.01); (Continued)

(58) Field of Classification Search
CPC .. B29D 99/0028; B29C 33/306; B29C 33/30; B29C 66/112; B29C 66/116; B29C 66/54; B29C 66/301; B29L 2031/085; Y02E 10/721; F03D 1/0683; F03D 1/0641
USPC .......................... 156/245, 501; 425/183, 441
See application file for complete search history.

(56) References Cited

U.S. PATENT DOCUMENTS

2007/0098561 A1 5/2007 Rochholz
2008/0075603 A1* 3/2008 Van Breugel et al. ........ 416/232
(Continued)

FOREIGN PATENT DOCUMENTS

DE 102010055874 B3 * 4/2012
EP 2 106 900 A1 10/2009
(Continued)

OTHER PUBLICATIONS

Search Report of the European Patent Office dated Sep. 26, 2012 for EP 12004027.4 on which this application is based.

*Primary Examiner* — William Bell
(74) *Attorney, Agent, or Firm* — Walter Ottesen P.A.

(57) ABSTRACT

A method for making a wind turbine rotor blade half shell includes arranging a fibrous material in a mold, which has an inner side predetermining an aerodynamic surface of the half shell and has a pinching edge defining the profile of a trailing edge of the half shell. A liquid plastics material surrounding the fibrous material is cured. An insert is arranged in relation to the mold in a predetermined position, in which a surface of the insert and a bordering portion of the inner side of the mold conjointly define an acute angle tapering toward the pinching edge, so that a thinly tapering trailing edge of the half shell is formed between the surface of the insert and the bordering portion.

20 Claims, 3 Drawing Sheets

(51) Int. Cl.
  *B29C 70/30*  (2006.01)
  *F03D 1/06*  (2006.01)
  *F03D 1/00*  (2006.01)
  *B29L 31/08*  (2006.01)
  *B29C 65/00*  (2006.01)
  *B29C 65/48*  (2006.01)

(52) U.S. Cl.
  CPC ........ *F05B 2280/6003* (2013.01); *Y02E 10/721* (2013.01)

(56) References Cited

U.S. PATENT DOCUMENTS

| | | | |
|---|---|---|---|
| 2010/0024215 A1* | 2/2010 | Torres Martinez | 29/889.7 |
| 2011/0103962 A1* | 5/2011 | Hayden et al. | 416/226 |
| 2011/0135485 A1 | 6/2011 | Wang | |
| 2011/0142674 A1* | 6/2011 | Dixon | 416/241 R |
| 2011/0171024 A1* | 7/2011 | Jensen | 416/1 |
| 2012/0067515 A1 | 3/2012 | Dahl et al. | |
| 2012/0134838 A1* | 5/2012 | Ramirez Jimenez et al. | 416/229 R |
| 2013/0177436 A1* | 7/2013 | Baucke et al. | 416/232 |

FOREIGN PATENT DOCUMENTS

| | | |
|---|---|---|
| JP | 61-192864 A | 8/1986 |
| WO | WO 95/19500 A1 | 7/1995 |
| WO | WO 9519500 A1 * | 7/1995 |
| WO | WO 9816746 A1 * | 4/1998 |
| WO | WO 01/46582 A2 | 6/2001 |
| WO | WO 03035380 A1 * | 5/2003 |
| WO | WO 2008010198 A1 * | 1/2008 |
| WO | WO 2011/113812 A1 | 9/2011 |
| WO | WO 2013013361 A1 * | 1/2013 |

* cited by examiner

METHOD FOR MAKING A WIND TURBINE ROTOR BLADE HALF SHELL OR WIND TURBINE ROTOR BLADE AND PRODUCTION MOLD THEREFOR

CROSS REFERENCE TO RELATED APPLICATION

This application claims priority of European patent application no. 12004027.4, filed May 23, 2012, the entire content of which is incorporated herein by reference.

FIELD OF THE INVENTION

The invention relates to a method for making a wind turbine rotor blade half shell, in which a fibrous material is arranged in a mold, which has an inner side, which predetermines an aerodynamic surface area of the half shell, and a pinching edge, which defines the profile of a trailing edge of the half shell. In the method, a liquid plastics material surrounding the fibrous material cures.

The invention also relates to a method for producing a wind turbine rotor blade in which a first half shell is provided. A second half shell is provided in a mold. Subsequently, the first half shell and the second half shell are adhesively bonded to each other.

The invention also relates to a production mold for producing a wind turbine rotor blade half shell with a mold, which has an inner side, which predetermines an aerodynamic surface area of the half shell, and a pinching edge, which defines the profile of a trailing edge of the half shell.

BACKGROUND OF THE INVENTION

Half shells for wind turbine rotor blades are generally produced separately from each other in separate half shell molds, in particular in vacuum infusion processes. After the curing, the two half shells are adhesively bonded to each other, generally lying one over the other in the region of the trailing edge, so that the thickness of the trailing edge is determined by the thicknesses of the two half shells and of the adhesive layer formed therebetween. It is known that, in particular in the regions of the rotor blade near the blade tip, trailing edges that are as thin as possible are aerodynamically advantageous and lead to a reduced development of noise.

United States patent application publication 2007/0098561 discloses a rotor blade in which the two half shells are adhesively bonded to each other such that the trailing edge is formed exclusively by the half shell on the suction side. The thickness of the trailing edge is accordingly not formed by both half shells plus the adhesive layer, but only by the half shell on the suction side.

United States patent application publication 2012/0067515 discloses a wind turbine rotor blade in which the entire rotor blade is not assembled from two half shells bat is produced in a single vacuum infusion process. It is just that the fibrous materials are placed into separate half shell molds. The known rotor blade also has a thick trailing edge, in which an end edge chord is arranged.

United States patent application publication 2011/0135485 A1 discloses a structural component in the form of a double T-beam for a wind turbine rotor blade. Details of how the rotor blade is assembled from this structural component and further elements are not described.

The publication WO 01/46582 A2 discloses a wind turbine rotor blade that is not constructed from half shells but from a multiplicity of segments, which are set against a centrally arranged spar box by means of elastic joints.

SUMMARY OF THE INVENTION

It is an object of the invention to provide a method for producing a wind turbine rotor blade half shell and a wind turbine rotor blade that simplifies the production of thin, aerodynamically advantageous trailing edges, and a production mold suitable therefor.

The method serves for producing a wind turbine rotor blade half shell and has the following steps:
arranging a fibrous material in a mold, which has an inner side, which predetermines an aerodynamic surface area of the half shell, and a pinching edge, which defines the profile of a trailing edge of the half shell,
curing a liquid plastics material surrounding the fibrous material, wherein
an insert is arranged in a predetermined position in relation to the mold, in which a surface of the insert and a bordering portion of the inner side of the mold at the pinching edge adjoin each other at an angle, so that a thinly tapering trailing edge of the half shell is formed between the surface of the insert and the bordering portion.

The fibrous material can, for example, foe glass fibers, carbon fibers, aramid fibers, other suitable reinforcing fibers or a mixture of these types of fiber. The fibers can in particular be arranged in the mold in the form of fiber woven fabrics or fiber non-woven fabrics with predetermined orientation of the fibers.

The liquid plastics material surrounds the fibrous material and cures during the process, so that the fibers are embedded into a plastics matrix. The fibrous material can be impregnated with the liquid plastics material before or after being arranged in the mold. Fibrous materials that are impregnated with the liquid plastics material already before being arranged in the mold are semi-finished, products that are referred to as prepregs. In the case of higher-grade semi-finished products, these can for example be pre-impregnated semi-finished fiber products or prefabricated parts that are pultruded, that is produced in a pultrusion process. Alternatively, the fibrous material can be impregnated after being placed in the mold, by means of vacuum infusion processes.

The mold has a pinching edge, which defines the profile of the trailing edge of the half shell to be produced. The pinching edge can be a visible marking, for instance a line. A depression or elevation, for example a channel or constriction, can also be formed in the mold as a marking. Such a configuration of pinching edges is known and normally has the effect that the half shell removed from the mold has a corresponding marking of the intended trailing edge contour, which can be used in particular for exact trimming following the production of the half shell. In the case of the invention, the pinching edge can also be just an imaginary line that corresponds to the intended position of the trailing edge of the half shell.

The fibrous material is surrounded by a liquid plastics material, for example by a mixture of resin and hardener, for example based on polyester, polyurethane or epoxy. The liquid plastics material can cure on the basis of a chemical reaction. In order to impregnate the fibrous material with the liquid plastics material, a vacuum infusion process can, in particular, be used in which the mold with the fibrous materials arranged therein is closed off in an airtight manner by a vacuum enclosure, for example by a vacuum bag, and a negative pressure is subsequently created in the mold. As a result of the negative pressure the liquid plastics material is introduced into the mold, until the fibrous material is impregnated with the liquid plastics material as uniformly and completely as possible. The insert can be enclosed together with the fibrous material by the vacuum enclosure.

Alternatively, the fibrous material can be in the form of so-called prepregs. Prepregs should be understood as meaning semi-finished products that are made of fibrous material and an uncured plastics matrix that surrounds the fibers, in other words consist of the fibrous material and a liquid plastics material. The plastics matrix is usually made of a mixture of epoxy resin and hardener. The processing of the prepregs can take place in the mold under the effect of pressure and temperature. When the prepregs are heated, the plastics material takes on a viscous consistency and bonds the fibrous material.

After the curing of the liquid plastics material, the fibrous material is embedded in a plastics matrix, and if required the half shell can be removed from the mold.

In the case of the invention, an insert is arranged in a predetermined position in relation to the mold. The insert has a surface which predetermines an outer area of the rotor blade half shell to be produced. In the predetermined position, the surface of the insert and a bordering portion of the inner side of the mold at the pinching edge adjoin each other at an angle. The angle corresponds to the angle, formed in the region of the trailing edge, of the outer surface areas of the half shell that converge at the trailing edge. The angle can in particular be less than 45°, but also less than 30°, less than 20° or less than 10°.

A thinly tapering trailing edge of the half shell is formed between the surface of the insert and the bordering portion. The outer surface areas of the half shell that converge in the region of the trailing edge adjoin each other at the aforementioned angle. Trailing edges with thicknesses of up to 10 mm or up to 5 mm or up to 3 mm should be regarded as thinly tapering trailing edges. It is understood that the trailing edge can be rounded off to a greater or lesser degree.

The insert can in particular foe arranged in a region of the mold near the blade tip, for example everywhere where the thickness of the trailing edge is less than, for example, 10 mm, less than 5 mm or less than 3 mm. The insert can extend over a length of, for example, at least 2 m, at least 5 m, at least 10 m or more, also over a length of more than 15 m or more than 20 m. The width of the insert and/or the width of the surface of the insert can, for example, be 5 cm or more, 10 cm or more, 20 cm or more. The insert can be divided into multiple insert segments. The insert can be made of a self-releasing material, that is a material that cannot be adhesively bonded with the liquid plastics material, for example of silicone or a material containing silicone. The insert can in particular be produced in a molding process, in particular as a silicone or polyurethane molding.

Arranging the insert in the predetermined position allows the optimum, thinly tapering form of the trailing edge to be formed dimensionally accurately directly during the production of the rotor blade half shell. Laborious finishing, in particular trimming of the half shell in the region of the trailing edge, is not required. Furthermore, the trailing edge of the half shell can be made particularly thin and taper theoretically almost to a thickness of zero.

In an embodiment, the fibrous material arranged in the mold reaches up to the surface of the insert. Saying that an item reaches up to a surface or an inner side or adjoins such a surface or inner side means here and hereafter that the item extends substantially up to the surface or inner side. It is not absolutely necessary for it to adjoin directly in the sense of there being contact between the item and the surface or innerside. For example, the surface or inner side can be provided with a gel coat, or some other layer, in particular a thin adhesive layer or a thin layer of the plastics material, can be arranged between the item and the surface or inner side. Because the fibrous material arranged in the mold reaches up to the surface of the insert, a great strength of the thinly tapering trailing edge of the half shell is achieved.

In an embodiment, the surface of the insert runs from the pinching edge up to a distance from the inner side that is greater than a material thickness of the half shell. The material thickness of the half shell can be measured in particular in a region near the thinly tapering trailing edge, in particular in a portion with substantially uniform material thickness, that is in a portion of the half shell that is not yet tapering toward the trailing edge. The material thickness can, for example, be 10 mm or more. In the case of this embodiment, the surface of the insert predetermines the cater surface area of the half shell on one side of the thinly tapering trailing edge.

In an embodiment, the insert is positioned in the predetermined position by positioning means and/or is fastened by fastening means. The positioning means can, for example, be guiding pins and/or openings, stops or markings on the mold and/or on the insert, which indicate the predetermined position of the insert in relation to the mold and/or definitively predetermine the position when the insert is set against the mold. Alternatively or in addition, fastening means with which the insert is fastened in the predetermined position can be provided, for example clamps, screws, magnetic closures or other fastening elements.

In an embodiment, the fibrous material is impregnated with the liquid plastics material after being arranged in the mold. This can take place, for example, in a vacuum infusion process.

In a method for producing a wind turbine rotor blade, it is envisaged, to produce a first half shell by the method described above for producing a wind turbine rotor blade half shell. Furthermore, a second half shell is provided. Subsequently, the first half shell and the second half shell are adhesively bonded to each other. During the adhesive bonding, the first half shell can still be in the mold in which, it was produced. Only the insert is removed before the adhesive bonding to the second half shell.

In an embodiment, an end edge of the rotor blade is formed by the trailing edge of the first half shell. Therefore, after the adhesive bonding, the first and second half shells are arranged such that the thinly tapering trailing edge of the first half shell forms the end edge of the rotor blade. The precision of the thinly tapering trailing edge that is achieved in the production of the wind turbine rotor blade half shell therefore decisively determines the aerodynamic properties of the end edge of the rotor blade.

In an embodiment, the trailing edge of the first half shell respectively forms an aerodynamic surface area on a pressure side and on a suction side of the rotor blade. Aerodynamic surface areas of the rotor blade are those surface areas around which air flows during operation and which contribute to the aerodynamic performance of the rotor blade. Under normal operating conditions, a positive pressure is produced on the pressure side of the rotor blade and a negative pressure on the suction side. In the case of conventional rotor blades, the pressure side and the suction side are formed substantially completely by the half shells on the pressure side and the suction side. This applies at least to the portions of the pressure side and the suction side that adjoin the end edge of the rotor blade. At the end edge, in the case of conventional rotor blades the pressure side and the suction side meet where the two half shells are adhesively bonded to each other. In the case of the invention, the trailing edge of the first half shell forms aerodynamic surface areas both on the pressure side and on the suction side. Consequently, the aerodynamic behavior of the rotor blade in the region of the end edge is substantially determined by the first half shell alone. Also for this reason, the achievable precision of the thinly tapering trailing edge is beneficial to how the rotor blade can perform aerodynamically.

In an embodiment, either the first half shell forms a pressure side of the rotor blade and a sloping area of the first half shell that adjoins the surface of the insert during the production of the first half shell forms part of the suction side of the rotor blade or the first half shell forms a suction side of the rotor blade and a sloping area of the first half shell that adjoins the surface of the insert during the production of the first half shell forms part of the pressure side of the rotor blade. Particularly advantageous is the first variant, in which the transition between the two half shells is formed on the suction side, in this case, the pressure side can be formed, at least in its rear region, possibly also over the entire profile depth, by the first half shell alone. Minor impairments of the surface in the transitional region between the two half shells that are difficult to avoid under some circumstances are then located exclusively on the suction side, so that they do not result in any impairment for the particularly important, smooth outward flow on the pressure side.

In an embodiment, the second half shell is adhesively bonded to the first half shell by an adhesive area that is arranged adjacent to the sloping area. The adhesive area can directly adjoin the sloping area. It is then at a distance corresponding to the width of the sloping area from the trailing edge of the first half shell and the end edge of the rotor blade. The trailing edge of the second half shell that is adhesively bonded by this adhesive area, therefore extends as far as possible up to the sloping area with regard to the required adhesive joint. This is conducive to a smooth and aerodynamically optimum design of the transition between the two half shells.

In an embodiment, during the adhesive bonding the second half shell is in a further mold, which has an inner side which projects rearwardly beyond the second half shell and rearwardly continues an aerodynamic surface area of the second half shell, the first half shell adjoining the inner side of the further mold. This embodiment simplifies the precise adhesive bonding of the two half shells to each other, because those regions of the first half shell that adjoin the further mold automatically continue rearwardly the aerodynamic surface area that Is formed by the second half shell in the desired way. The first half shell can adjoin the inner side of the further mold in particular with the described sloping area, in particular over the surface area or over the full surface area.

In an embodiment, an adhesive joint between the first and second half shells in the region of the adhesive area is filled with adhesive up to the inner side of the further mold. The inner side of the further mold closes the adhesive joint. As a result, the gap arranged between the two half shells is completely filled up to the desired aerodynamic surface area. Excess adhesive is displaced into the interior of the rotor blade. This makes it possible to dispense with laborious finishing of the rotor blade surface; in particular it is not necessary to close a remaining gap by filling.

The method serves for producing a wind turbine rotor blade and has the following steps:
providing a first half shell in a mold,
providing a second half shell in a further mold,
adhesively bonding the first half shell to the second, half shell, wherein the further mold has an inner side which projects rearwardly beyond the second half shell and rearwardly continues an aerodynamic surface area of the second half shell, and the first half shell lies against the inner side of the further mold.

This way of achieving the solution takes up the idea mentioned in the embodiments described above of achieving an aerodynamically optimum form in a simple way when adhesively bonding the two half shells. Therefore, reference is made to the explanations given above in relation to the embodiments concerned. The method can be carried out independently of how the first half shell has specifically been produced. It goes without saying that one of the methods described above can be used for this. That is not necessary however. In particular, the first half shell can be produced without using the insert described.

In the same way as in the case of the methods described above, in the method the two half shells have already cured when they are adhesively bonded to each other. As also in the case of the methods described above, either the pressure side or the suction side is formed by the first half shell alone. The other side respectively is formed from the front to the rear in the direction of flow by the second half shell, the adhesive joint between the first and second half shells and a surface of the first half shell that was arranged adjoining the inner side of the mold or lying against the inner side of the mold during the adhesive bonding. This surface can in particular be the sloping area described above.

In an embodiment, the first half shell has a thinly tapering trailing edge with a sloping area and, during the adhesive bonding to the second half shell, the first half shell adjoins the inner side of the mold with the sloping area, over the surface area. In this way, an arrangement of the two half shells that corresponds exactly to the desired aerodynamic profile is ensured during the adhesive bonding.

In an embodiment, an adhesive joint arranged between the two half shells is filled with adhesive up to the inner side of the mold. In this respect, reference is made to the explanations given above.

The production mold serves for producing a wind turbine rotor blade half shell and has
a mold, which has an inner side, which predetermines an aerodynamic surface area of the half shell, and a pinching edge, which defines the profile of a trailing edge of the half shell,
an insert, which has a surface, and
positioning means for positioning and/or fastening means for fastening the insert in a predetermined position in relation to the mold, wherein
in the predetermined position, the surface of the insert and a bordering portion of the inner side of the mold at the pinching edge adjoin each other at an angle, so that a thinly tapering trailing edge can be produced between the surface of the insert and the bordering portion.

The production mold is intended for producing a wind turbine rotor blade half shell according to the method described above. For the features and advantages of the production mold, reference is made to the explanations given above of the method.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
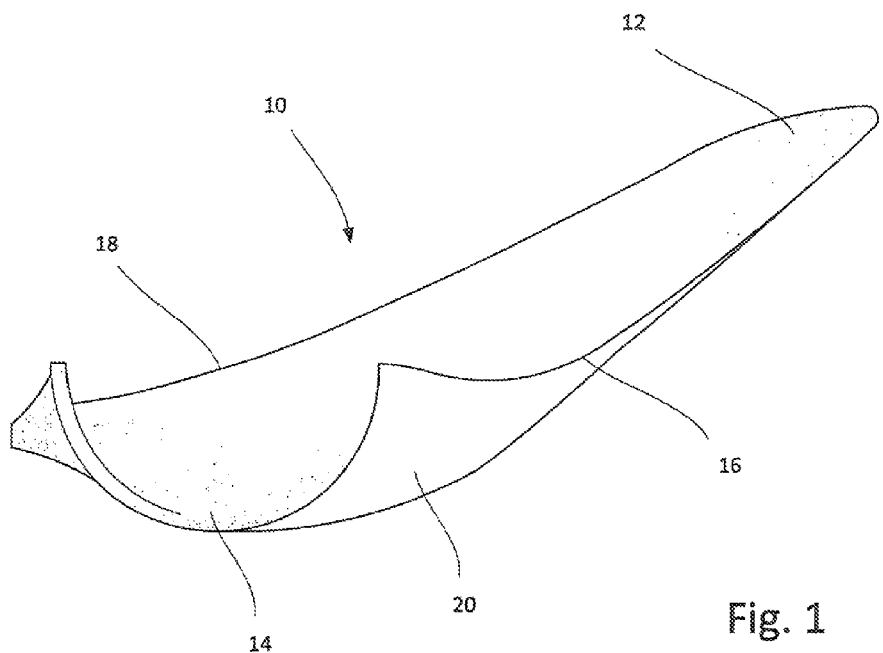
FIG. 1 shows a wind turbine rotor blade half shell produced by the method according to the invention in a schematic, perspective view.

The wind turbine rotor blade half shell 10 represented in FIG. 1 has an end 12 on the blade tip side, an end 14 on the blade root side, a leading edge 16 and a trailing edge 13. The outer side 20 of the half shell 10 forms an aerodynamic surface area of the rotor blade, either the pressure side or the suction side.

Figure 2:
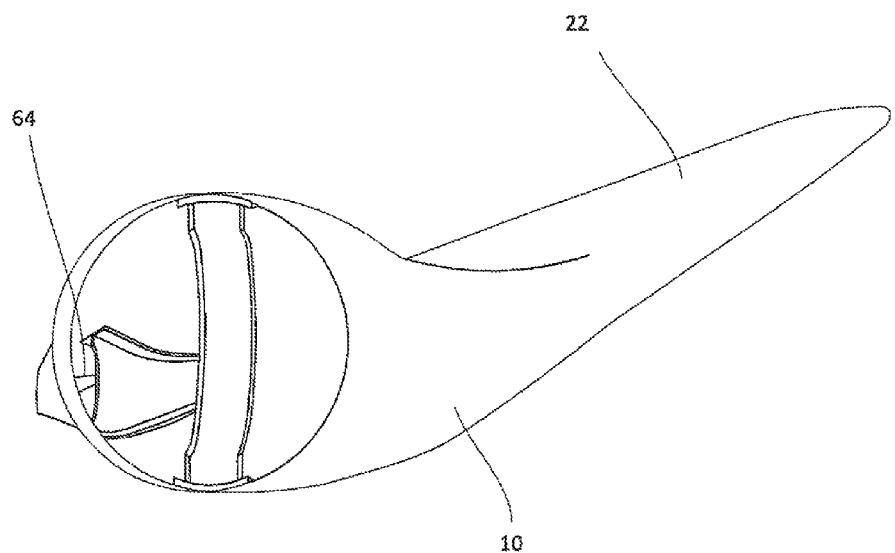
FIG. 2 shows a wind turbine rotor blade produced by the method according to the invention in a schematic, perspective view.

In FIG. 2, the first half shell 10 of FIG. 1 is shown in the state in which it is connected to a second half shell 22. Together, the two half shells 10, 22 form a wind turbine rotor blade with an end edge 64, which, at least in a longitudinal portion of the rotor blade that is near the blade tip, is formed by the trailing edge 18 of the first half shell 10.

Figure 3:
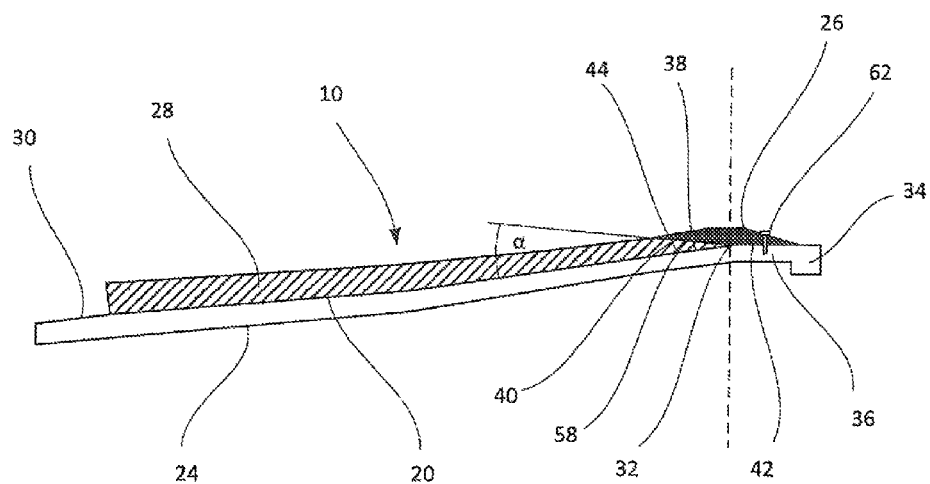
FIG. 3 shows part of a production mold according to the invention with part of a first half shell produced therein, in cross section.
Figure 4:
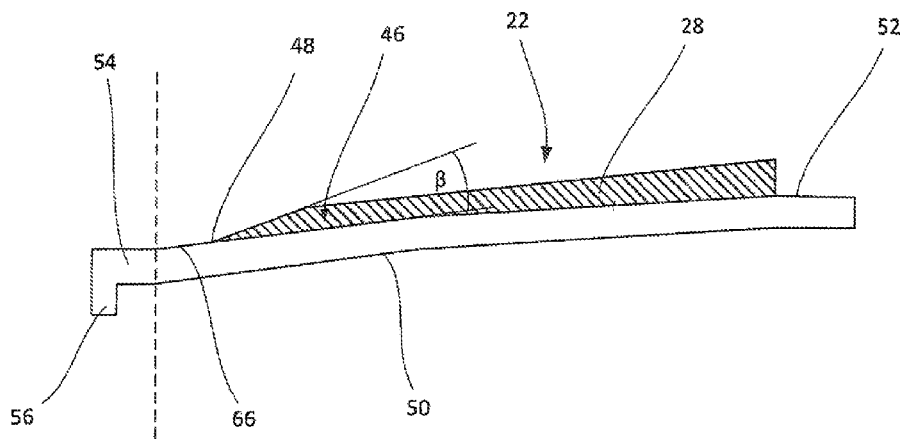
FIG. 4 shows part of a second half shell in a further mold, in cross section; and, FIG. 5 shows parts of a first and a second half shell during the adhesive bonding, in cross section.
Figure 5:
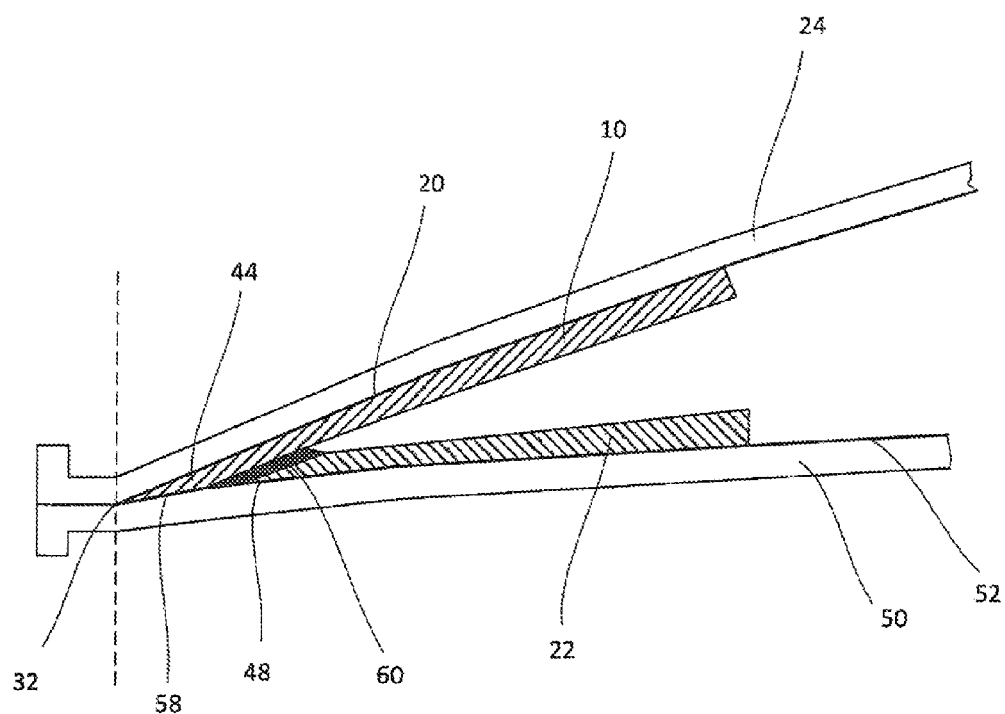

Further details can be seen better from the cross-sectional representations of FIGS. 3 to 5. FIG. 3 shows a production mold, which has a mold 24 and an insert 26. Arranged in the mold 24 is a fibrous material 28, which after impregnation with a liquid plastics material and curing of the liquid plastics material forms together with the plastics material the first half shell 10.

FIG. 3 shows only a portion of both the mold 24 and the fibrous material 28 forming the first half shell 10 in the region of the trailing edge IS. Both the mold 24 and the fibrous material 28 can extend up to the leading edge 16 of the first half shell 10 to be produced, or in the case of the mold 24 also beyond that.

The mold 24 has an inner side 30, which predetermines an aerodynamic surface area of the first half shell 10, specifically the outer side 20 of the first half shell 10 that adjoins the inner side 30 of the mold 24. On the inner side 30 the mold 24 also has a pinching edge 32, the position of which is illustrated by the dashed line. The mold 24 projects rearwardly beyond the pinching edge 32 and has there a border 36) that is provided with, a collar 34. On the other side of the pinching edge 32, the inner side 30 has a bordering portion 38, which has a width in the range of, for example, 1 cm to 20 cm and adjoins the pinching edge 32.

The insert 26 is a strand of a silicone or laminate material produced in a molding or laminating process. It has a substantially trapezoidal cross section. The insert 26 has a surface 40, which adjoins the pinching edge 32 of the mold 24. With a surface area 42 adjoining the surface 40, the insert 26 lies against the border 36 of the mold 24.

The surface 40 of the insert 26 and the bordering portion 38 of the inner side 30 of the mold 24 are arranged lying opposite each other. Formed between the two is an acute angle α, which in the example represented has a size of approximately 20°.

The fibrous material 28 arranged in the mold 24 has been partially pushed forward under the insert 26. The insert adjoins the surface 40, so that, after the infusion and curing of the liquid plastics material, a sloping area 58 is produced. During the production of the first half shell 10, a thinly tapering trailing edge 44 of the first half shell 10 is formed between the surface 40 and the bordering portion 38.

Positioning means 62 in the form of a threaded bolt, with which the insert 26 is positioned against the mold 24 and fastened, are only indicated in FIG. 3.

In FIG. 4, the rear part of the second half shell 22 from FIG. 2 is represented in cross section. It likewise consists of a fibrous material 28 and has in a region near its trailing edge 48 a material thickness 46 of, for example, 10 mm. Toward the trailing edge 48, the material thickness 46 decreases uniformly, so that the second half shell 22 tapers uniformly thinly at an angle β, which corresponds substantially to the angle α between the surface 40 of the insert 26 and the bordering portion 38 of the inner side 30 of the mold 24.

In FIG. 4, the second half shell 22 is in a further mold 50. The further mold 50 predetermines with its inner side 52 an aerodynamic surface area of the second half shell 22, specifically the outer surface area of the second half shell 22 that adjoins the inner side 52. Furthermore, the further mold 50 likewise has a border 54, on which a collar 56 is formed. The dashed line illustrates the position of the pinching edge 32 formed on the mold 24 when said edge is arranged in the position intended for it on the further mold 50 for the adhesive bonding of the first half shell 10 to the second half shell 22. It can be seen that the pinching edge 32 on the mold 24 is then arranged at a distance from the trailing edge 48 of the second half shell 22.

The inner side 52 of the mold 50 projects rearwardly beyond the second half shell 22 and, as can be seen in FIG. 4, rearwardly continues in the region 66 the aerodynamic surface area that is formed by the outer side of the second half shell 22.

FIG. 5 shows the arrangement of the parts shown in FIGS. 3 and 4 during the adhesive bonding of the first half shell 10 with the second half shell 22. The dashed line again indicates the exact position of the pinching edge 32 on the molds 24, 50. The further mold 50 is located underneath in FIG. 5 and has remained substantially in the position shown in FIG. 4, while the mold 24 with the first half shell 10 arranged therein has been rotated by 180° in comparison with the position in FIG. 3 and swung onto the further mold 50.

It can be seen that the outer side 20 of the first half shell 10 extends up to the pinching edge 32 and alone forms the aerodynamic surface area that is represented on top in FIG. 5. In the example, this aerodynamic surface area is the pressure side.

The thinly tapering trailing edge 44 of the first half shell 10 also has a sloping area 58, the exact arrangement of which was predetermined during the production of the first half shell 10 by the surface 40 of the insert 26. During the adhesive bonding, that is in the arrangement shown in FIG. 5, this sloping area 58 lies against the inner side 52 of the further mold 50 over the surface area.

Between the first half shell 10 and the second half shell 22 there is formed an adhesive joint 60, which is completely filled with an adhesive. The adhesive extends up to the inner side 52 of the further meld 50. The inner side 52 closes off the adhesive joint 60 and thus prevents adhesive from escaping. After the demolding of the rotor blade, the region of the end edge that is formed by the sloping area 58 of the first half shell 10, the adhesive joint 60 filled with adhesive and the trailing edge 48 of the second half shell 22 has a smooth surface, which does not require any further finishing.

It is understood that the foregoing description is that of the preferred embodiments of the invention and that various changes and modifications may be made thereto without departing from the spirit and scope of the invention as defined in the appended claims.

LIST OF THE DESIGNATIONS USED 10 first half shell
12 end on the blade tip side
14 end on the blade root side
16 leading edge
18 trailing edge
20 outer side of the first half shell
22 second half shell
24 mold
26 insert
28 fibrous material
30 inner side of the mold
32 pinching edge
34 collar
36 border
38 bordering portion
40 surface of the insert
42 surface area
44 thinly tapering trailing edge
46 material thickness
48 trailing edge of the second half shell
50 further mold
52 inner side of the further mold
54 border
55 collar
58 sloping area
60 adhesive joint
52 positioning means
64 end edge
66 region for continuing the aerodynamic surface area

What is claimed is:

1. A method for making a wind turbine rotor blade half shell comprising the steps of:
    arranging a fibrous material in a mold having an inner side which determines an aerodynamic surface area of the half shell and having a pinching edge defining the profile of a trailing edge of the half shell;
    curing a liquid plastics material surrounding the fibrous material; and,
    arranging an insert in a predetermined position in relation to the mold in which a surface of the insert and a bordering portion of the inner side of the mold conjointly define an acute angle tapering toward the pinching edge so that a thinly tapering trailing edge of the half shell is formed between the surface of the insert and the bordering portion.

2. The method of claim 1, wherein the fibrous material arranged in the mold reaches up to the surface of the insert.

3. The method of claim 1, wherein the surface of the insert runs from the pinching edge up to a distance from the inner side that is greater than a material thickness of the half shell.

4. The method of claim 1, wherein the insert is arranged in its position via positioning elements.

5. The method of claim 1 further comprising the step of fastening the insert in the arranged position with fastening elements.

6. The method of claim 1 further comprising the step of impregnating the fibrous material with liquid plastics material after arranging the fibrous material in the mold.

7. A method for making a wind turbine rotor blade comprising the steps of:
    producing a first half shell by arranging a fibrous material in a mold which has an inner side determining an aerodynamic surface area of the first half shell and has a pinching edge which defines the profile of a trailing edge of the first half shell; curing a liquid plastics material surrounding the fibrous material; and, arranging an insert in a predetermined position in relation to the mold in which a surface of the insert and a bordering portion of the inner side of the mold conjointly define an acute angle tapering toward the pinching edge so that a thinly tapering trailing edge of the first half shell is formed between the surface of the insert and the bordering portion;
    providing a second half shell; and,
    adhesively bonding the first half shell to the second half shell.

8. The method of claim 7, wherein an end edge of the rotor blade is formed by the trailing edge of the first half shell.

9. The method of claim 7, wherein the trailing edge of the first half shell forms an aerodynamic surface area on both a pressure side and a suction side of the rotor blade.

10. The method of claim 7, wherein an end edge of the rotor blade is formed by the trailing edge of the first half shell and the trailing edge of the first half shell forms an aerodynamic surface area on both a pressure side and a suction side of the rotor blade.

11. The method of claim 7, wherein the first half shell forms a pressure side of the rotor blade and a sloping surface of the first half shell that adjoins the surface of the insert during the production of the first half shell forms part of the suction side of the rotor blade or the first half shell forms a suction side of the rotor blade and a sloping surface of the first half shell that adjoins the surface of the insert during the production of the first half shell forms part of the pressure side of the rotor blade.

12. The method of claim 11 wherein the second, half shell is adhesively bonded to the first half shell by an adhesive area that is adjacent to the sloping surface.

13. The method of claim 7, wherein during the adhesive bonding, the second half shell is in a further mold having an inner side which projects rearward beyond the second half shell and rearwardly continues an aerodynamic surface area of the second half shell and the first half shell adjoins the inner side of the further mold.

14. The method of claim 13 further comprising the step of filling an adhesive joint between the first and the second half shells in the region of an adhesive area with adhesive up to the inner side of the further mold.

15. A method for making a wind turbine rotor blade comprising the steps of:
    providing a first half shell in a first mold;
    providing a second half shell in a second mold which has an inner side which projects rearward beyond the second half shell and rearwardly continues an aerodynamic surface area of the second half shell; and,
    adhesively bonding the first half shell, which lies against the inner side of the second mold, to the second half shell.

16. The method of claim 15, wherein the first half shell has a thinly tapering trailing edge with a sloping surface and, during the adhesive bonding to the second half shell, the sloping surface is in surface contact with the inner side of the second mold.

17. The method of claim 15 further comprising the step of filling an adhesive joint arranged between the first and the second half shells with adhesive up to the inner side of the second mold.

18. A production mold for making a wind turbine rotor blade half shell having an aerodynamic surface area and a trailing edge, the production mold comprising:
- a mold having an inner side which is configured to predetermine the aerodynamic surface area of the half shell and having a pinching edge which defines the contour of the trailing edge of the half shell;
- an insert defining a surface;
- a positioning element configured to position said insert in a predetermined position in relation to said mold;
- said inner side of said mold having a bordering portion at said pinching edge;
- said surface of said insert and said bordering portion of said inner side of said mold conjointly defining an acute angle tapering toward said pinching edge in such a manner that a thinly tapering trailing edge of the rotor blade half shell can be produced between said surface of said insert and said bordering portion.

19. The production mold of claim 18, wherein said positioning element is further configured to fasten said insert in said predetermined position.

20. The production mold of claim 18, wherein said positioning element is a fastening member configured to fasten said insert in a predetermined position in relation to said mold.

* * * * *

UNITED STATES PATENT AND TRADEMARK OFFICE
CERTIFICATE OF CORRECTION

| | | |
|---|---|---|
| PATENT NO. | : 9,108,376 B2 | Page 1 of 1 |
| APPLICATION NO. | : 13/776214 | |
| DATED | : August 18, 2015 | |
| INVENTOR(S) | : D. Austinat et al. | |

It is certified that error appears in the above-identified patent and that said Letters Patent is hereby corrected as shown below:

In The Specification

In Column 2:
Line 25: delete "foe" and insert -- be -- therefor.

In Column 3:
Line 37: delete "foe" and insert -- be -- therefor.

In Column 4:
Line 16: delete "cater" and insert -- outer -- therefor

In Column 5:
Line 19: delete "side, in" and insert -- side. In -- therefor.

In Column 7:
Line 20: delete "13" and insert -- 18 -- therefor.
Line 39: delete "IS" and insert -- 18 -- therefor.

In Column 8:
Line 59: delete "meld" and insert -- mold -- therefor.

In Column 9:
Line 30: delete "55" and insert -- 56 -- therefor.
Line 33: delete "52" and insert -- 62 -- therefor.

Signed and Sealed this
First Day of March, 2016

Michelle K. Lee
*Director of the United States Patent and Trademark Office*